United States Patent [19]

Sanfilippo et al.

[11] 4,133,360

[45] Jan. 9, 1979

[54] PORTABLE CIRCULAR POWER HAND SAW BENCH

[76] Inventors: Anthony Sanfilippo; Evangelyne L. Sanfilippo, both of 1554 Ramona La., St. Charles, Mo. 63301

[21] Appl. No.: 734,240

[22] Filed: Oct. 20, 1976

Related U.S. Application Data

[63] Continuation of Ser. No. 648,621, Jan. 12, 1976, abandoned.

[51] Int. Cl.² ........................ B25H 1/02; B26D 1/14
[52] U.S. Cl. ........................ 144/286 R; 83/471.2; 83/477.2; 83/574
[58] Field of Search .......... 144/286 R, 286 A, 134 D, 144/136 C; 83/471.2, 471.3, 477, 477.1, 477.2, 483, 574, 484, 485; 248/13; 108/28, 31

[56] References Cited

U.S. PATENT DOCUMENTS

| | | | |
|---|---|---|---|
| 1,457,492 | 6/1923 | Bloodgood | 83/471.3 |
| 2,515,008 | 7/1958 | Humphrey | 83/471.2 |
| 2,630,147 | 3/1953 | Garberg | 83/471.3 X |
| 2,702,569 | 2/1955 | Yelle | 144/134 D |
| 2,719,547 | 10/1955 | Gjerde | 83/471.3 |
| 2,739,624 | 3/1956 | Haddock | 83/574 |
| 2,765,820 | 10/1956 | Perkins | 83/574 X |
| 3,283,790 | 11/1966 | Striebig | 83/471.3 |
| 3,389,724 | 6/1968 | Paul | 83/745 X |
| 3,403,709 | 10/1968 | Retherford et al. | 83/483 |
| 3,727,502 | 4/1973 | Steinman | 83/471.3 |
| 4,007,657 | 2/1977 | Burch | 83/471.3 |

Primary Examiner—Travis S. McGehee
Assistant Examiner—W. D. Bray
Attorney, Agent, or Firm—Gravely, Lieder & Woodruff

[57] ABSTRACT

A portable circular power hand saw bench arranged to allow the full performance of a power hand saw in cross cut and ripping operations, the bench being provided with a work support surface, a frame with adjustable guides for the power saw which suspends the power saw over the work pieces, and means to permit the bench to be folded into a compact form for shipping or storage when not in use or to be unfolded and extended to handle work pieces of some length or width.

5 Claims, 5 Drawing Figures

PORTABLE CIRCULAR POWER HAND SAW BENCH

BRIEF SUMMARY OF THE INVENTION

This is a continuation of application Ser. No. 648,621, filed Jan. 12, 1976 now abandoned.

This invention relates to improvements in a portable circular power hand saw bench for supporting power tools while cutting or forming a work piece.

The bench is made of easily formed components which will result in making it lightweight and foldable, and easily adaptable to accommodate most any of the currently popular power tools which can cross cut, or rip or turn out various shapes.

The improved work bench is equipped to allow for the use of inexpensive power tools, such as a circular power hand saw, and to perform every function which the power tools are designed to perform while at the same time permitting the user to obtain accuracy the equivalent of heavy, non-portable, and much more expensive work benches equipped to handle power tools. The improved portable work bench is provided with a power tool guide track that is capable of accommodating a variety of power tools, such as routers, sabre saws, and the like. Furthermore the work bench is capable of being extended from a minimum work area to one in which the overall length can be increased by extending work supporting leaves so as to accommodate work pieces of unusual length.

In constructing the bench, there is provided a principal work surface which is supported on foldable legs which in the unfolded positions support the work surface at a convenient heighth for an operator when standing. There are extension leaves which when pulled out lengthen the work surface. A frame is carried on the work surface and is adapted to support power tool guides in either a cross cutting or ripping position. Work guide blocks are provided on the work surface in position to fix the position of a work piece prior to cutting or performing an operation with a power tool.

A preferred embodiment of the present invention is exemplified in a principal work surface, a pair of elongated slots formed in the work surface at right angles to each other and spaced apart in positions for work piece forming operations or for accommodating different power tools, work piece adjustable guide fences movable along the work surface and arranged substantially parallel to one of the elongated slots, a power tool supporting frame spaced above the work surface and related with the elongated slots, and power tool guide tracks releasibly mounted on the frame to assume positions in which the tracks are aligned with either of the elongated slots.

BRIEF DESCRIPTION OF THE DRAWINGS

The preferred embodiment of the present invention is shown in the accompanying drawings, wherein:

FIG. 1 is a perspective view of the present bench set up in working position, but with a power tool and guide track means removed for clarity of disclosure, and with the extension leaves folded in;

DETAILED DESCRIPTION OF THE EMBODIMENT

Figure 1:
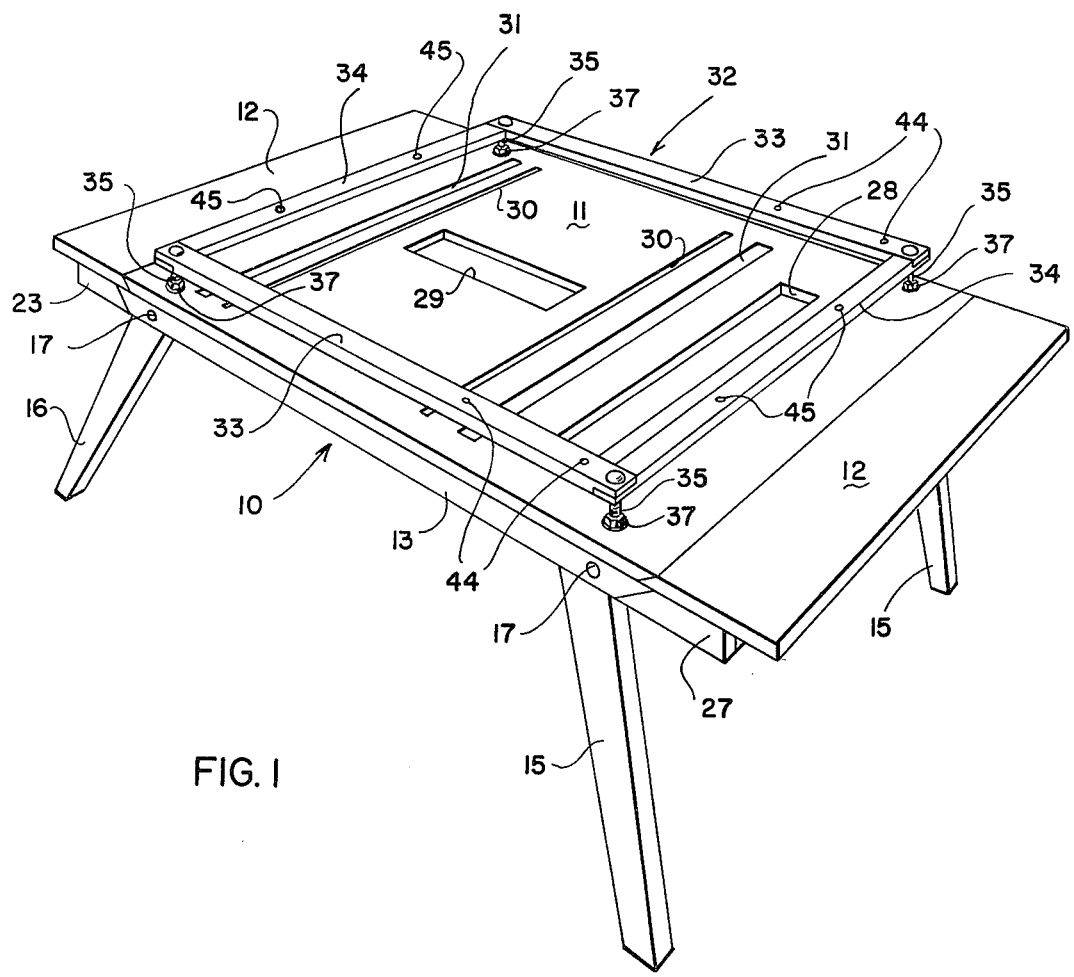
Figure 2:
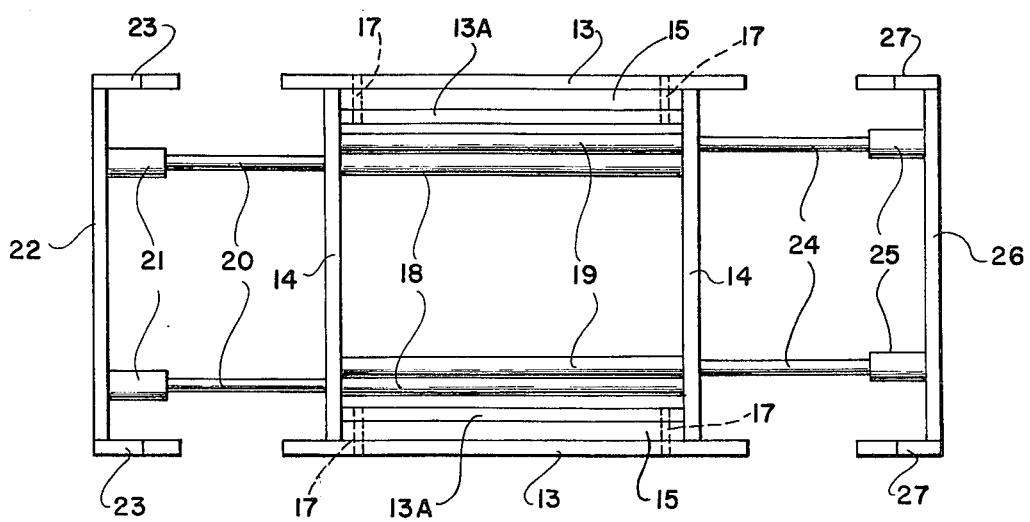
FIG. 2 is a top plan view of the bench with the top work surface and extension leaves removed to reveal details of the frame.
Figure 3:
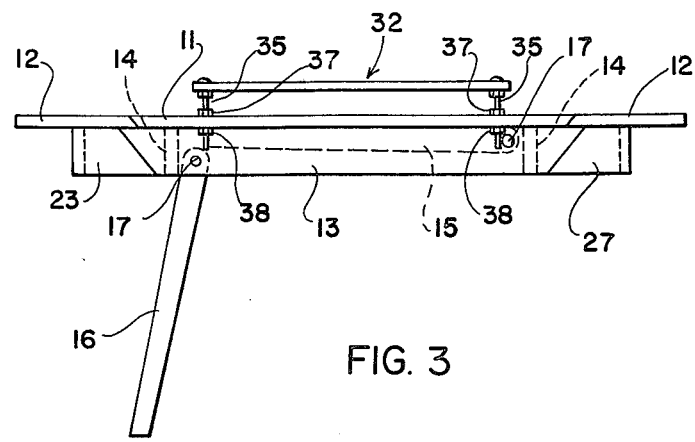
FIG. 3 is a side elevation view of the bench with one side leg extended and the other side leg folded.

In FIGS. 1 and 2 the work bench 10 is seen to be made up of a principal work surface 11 and cooperating work supporting adjustable leaves 12 located at opposite ends of the work surface 11. The work surface 11 is supported, as shown in FIGS. 2 and 3 by a frame composed of side members 13 fixed in spaced relation by stretchers 14. Spaced inner side members 13A form pockets with side members 13 to accommodate the bench legs 15 and 16. Suitable pivot pins 17 are provided in position to allow the legs 15 to be folded first and the legs 16 to be folded last. When extended the legs rest against the stretchers 14 in splayed positions, and when folded they are concealed within the pockets.

As seen in FIG. 2 the stretchers 14 support two pairs of tubes, one pair of tubes being seen at 18 and the other pair of tubes being seen at 19. The pairs of tubes are arranged adjacent each other and are disposed inside the side members 13A and outside of the position of the foldable legs 15 and 16. The tubes have their ends extended through the stretchers 14 so as to be open for the reception of telescoping tubes which permit the leaves 12 to be extended to lengthen the work surface 11. The tubes 18 are adapted to receive telescoping tubes 20 which are fixed in end members 21 attached to a stretcher 22 forming the end support for one of the work supporting leaves 12. The end support stretcher 22 carries short side rails 23 which in the folded condition of the leaf 12 abutt with the ends of the side members 13. As shown in FIG. 1 the rails 23 and the side members 13 have the abutting ends mitered so as to make a neat fit. In a similar manner the tubes 19 project through the stretcher 14 at the opposite side of the assembly so as to receive tubes 24 which are fixed in end members 25 attached to stretcher 26 which supports the opposite work supporting leaf 12. Stretcher 26 carries side rails 27 which abut with the ends of the side members 13 in a manner similar to that described for the opposite supporting structure of leaf 12.

Figure 5:
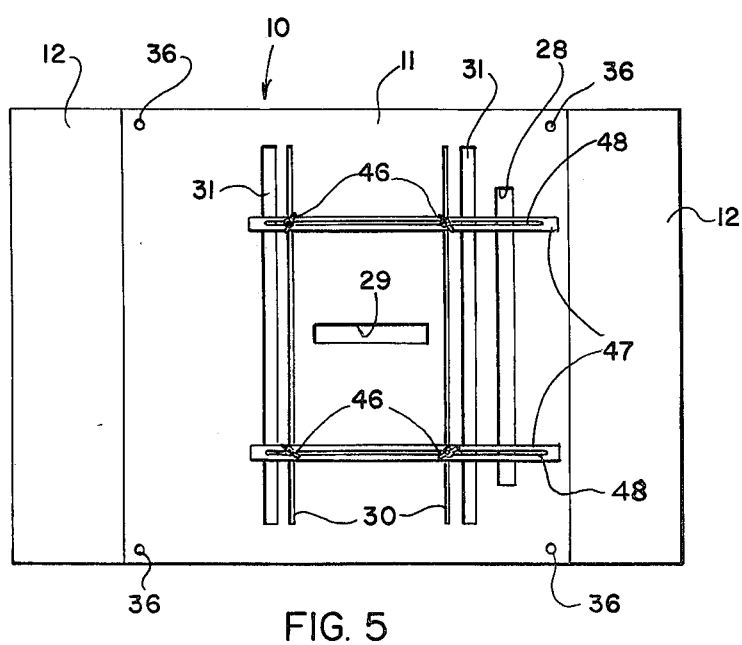
FIG. 5 is a plan view of the work surface arranged with elongated and parallel guide slots for permitting adjustment of the work piece locating blocks in relation to both of the elongated slots.

The work surface 11 in FIG. 1 and FIG. 5 is provided with an elongated slot 28 adjacent the work supporting leaf 12 shown at the right hand end of the work bench. While the slot 28 is directed transversely of the length of the work bench there is a second slot 29 which is located centrally of the work surface 11 between side members 13, and this slot is directed parallel with the lengthwise dimension of the work surface 11 so as to be perpendicular to the elongated transverse slot 28. Surface 11 is also formed with parallel and elongated narrow secondary slots 30 which are parallel with transverse slot 28 and perpendicular to longitudinal slot 29. The purpose for secondary slots 30 will be described presently. Adjacent each of the narrow slots 30 there is disposed a measuring rule 31 adapted to cooperate with the working set up for the tools to be used in conjunction with the work bench.

The work bench 10 supports a tool carrying or supporting frame assembly 32 which is made up of side members 33 and end members 34 fitted at the meeting corners as shown in FIG. 1 and in which the members 33 and 34 are the same length so that the tool carrying frame 32 is square. Each corner of the frame assembly is engaged by a threaded shaft 35, and each shaft extends through a suitable aperture 36 (FIG. 5) in the work surface 11 so as to project below the work surface. Adjusting nuts 37 and 38 are carried by the threaded shafts 35 in position to fix the spacing of the frame assembly 32 above the work surface 11. Thus, the frame assembly 32 may be raised by lowering the nuts 38, so as to permit the threaded shafts 35 to be pulled upwardly after which nuts 37 can be threaded down to again engage the work surface. Lowering of the frame assembly 32 is accomplished by reversing the threading adjustment of the nuts 37 and 38.

Figure 4:
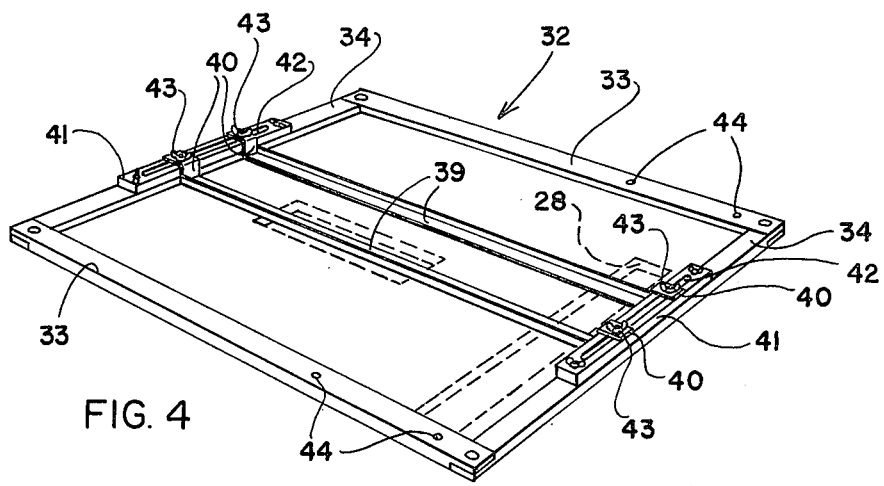
FIG. 4 is a perspective view of the principal tool supporting frame with the tool guide tracks in position to be parallel to one of the elongated slots in the work surface, the view also showing the mounting provision for the alternate position of the guide tracks in relation to the other elongated slot.

It can be seen more clearly in FIG. 4 that the frame assembly 32 is adapted to support a tool guide means in the form of a track composed of a pair of track elements 39 which are in the shape of angle members with one leg horizontal and the other leg vertical and in which the vertical legs define the outer limits of and are at the outer side of the horizontal legs. The ends of the track elements are supported by brackets 40 which engage on mounting blocks 41. Each mounting block is formed with a longitudinal slot 42 to receive a carriage bolt engaged by a wing nut 43. The carriage bolt extends upwardly through the slot 42 and through brackets 40 at each end of the tracks 39 so as to be engaged by wing nut 43. In this manner the tracks 39 may be adjusted along the length of the block 41, thereby making it possible to locate the tracks as desired along the length of the transverse slot 28 which is shown in phantom outline in FIG. 4 for the purpose of illustrating the adjustment feature for the track elements 39. Each block 41 is attached to the underlying frame member 34 by suitable bolts at each end of the blocks. The side members 33 for the frame assembly 32 are provided with additional apertures 44 so that the blocks 41 may be detached from the members 34 and repositioned on the members 33 and secured thereto by the bolts extending through the apertures 44. The apartures 44 in the members 33 are associated with the transverse slot 28 in the work surface 11 and that other apertures 45 in the members 34 are located so as to be centered in relation to the longitudinal slot 29. Accordingly, the blocks 41 can be positioned in either parallel alignment with the slot 29 or with the slot 28 thereby making it possible to support a power tool movement along the track elements 39 in either direction of slots 28 or 29. If the power tool is a disk saw the saw blade can be located over the slots 29 and 28 so as to avoid cutting or marring the work surface 11 and suitable clamps of well known type can be used to secure the power tool to the track elements 39.

As previously mentioned, in relation to FIG. 5, the work surface 11 is formed with parallel slots 30 and these are adapted to receive carriage bolts which are engaged at the upper side of the work surface 11 with wing nuts 46 for the purpose of securing guide fences 47 in position so as to be movable toward or away from the longitudinal slot 29 and to be movable along the length of transverse slot 28. Each guide fence is formed with an elongated slot 48 which will permit the guide fences to be maneuvered into positions at an angle to either slot 29 or 28 for the purpose of permitting saw cuts at an angle to the work piece for mitering operations or similar forming operations in which an angular formation is desired. In order to accommodate angular settings of the guide fences it is shown in FIG. 5 that the guide fences and slots 47 therein are sufficiently elongated so as to span the distance between the slots 30 when set at a desired angular position.

The foregoing description relates to an improved work bench which is foldable and lightweight to make it easily portable. The principal working surface of the work bench is provided with an adjustable height frame for supporting a power tool track whereby forming operations on a work piece can be performed with accuracy and whereby the same forming operation can be performed on many work pieces. There has been set forth the improvements of power tool guide tracks which can be adjusted to accommodate different sizes of power tools, or can be positioned in multiple set-ups for performing operations that necessarily involve different positions for the power tools, such as performing a cross-cut or a rip on a work piece.

The foregoing disclosure has set forth an improved portable work bench which has a minimum size of principal work surface, but is augmented by adjustable extension leaves that can be drawn out to increase the size of the supporting surface for work pieces. In addition to the extension leaves, the work bench is provided with work guide fences which can be set to many different positions for locating the position of a work piece, or for holding a work piece against undesired displacement during a power tool forming operation, and the guide fences cooperate with measuring rules which permit setting the guide fences in desired positions for obtaining repetitive forming operations.

What is claimed is:

1. In a work bench for supporting a power tool in operative positions for performing a variety of operations on a workpiece, the improvement which comprises: a workpiece supporting surface, said supporting surface having a first elongated slot opening therethrough and a second elongated slot opening therethrough oriented with its lengthwise dimension at substantially right angles to the lengthwise dimension of said first slot; power tool support frame means formed by opposed side and end members of equal lengths to form a square opening over said support surface with certain of said members of said frame means being parallel to one slot and certain others of said members of said frame means being parallel to the other slot; means attaching said frame to said supporting surface in spaced relation therefrom and in position to encompass said first and second slots; power tool guide means; and means connecting said power tool guide means to said frame means in selective positions of alignment with said first and second slots to position the power tool to perform an operation on a workpiece positioned on said supporting surface adjacent the selected position of said power tool guide means, said means connecting said power tool guide means to said frame means being interchangeably supported by said side and end members adjacent one of said slots.

2. The work bench improvement set forth in claim 1, wherein said power tool support frame includes opposed side and end members of substantially equal lengths connected to form four corners, said attaching means being operatively disposed at each of said corners, and said means connecting said carriage means to said frame means includes mounting blocks selectively engageable with said side and end members.

3. The work bench improvement set forth in claim 1, wherein said power tool guide means includes spaced track elements supported by and between said mounting blocks in positions to straddle said slots; and means securing said track elements to said mounting blocks to permit selective spacing between said track element and straddle location relative to said slots.

4. The work bench improvement set forth in claim 1, wherein workpiece guide means is carried by said supporting surface, said workpiece guide means having elongated slots therein, said supporting surface having a pair of elongated secondary slots therein arranged substantially parallel to each other and to one of said first and second slots and being spaced apart to straddle the other of said first and second slots, and releasible securing means interconnects said workpiece guide means and supporting surface through said elongated slots in said workpiece guide means and said secondary slots to permit adjustments between said workpiece guide means and said first and second slots, whereby said workpiece guide means may be located at selected angular positions relative to said first and second slot openings.

5. In a work bench for supporting a power tool in operative position for performing a variety of operations on a workpiece, the improvement which comprises: a workpiece supporting surface, said supporting surface having a first elongated slot opening therethrough and a second elongated slot opening therethrough and oriented with its lengthwise dimension substantially at right angles to the lengthwise dimension of said first slot; power tool supporting frame means attached to said supporting surface in spaced relation thereover and positioned to encompass said first and second slots; power tool guide means; means connecting said power tool guide means to said supporting frame in selective positions of parallel alignment with respect to said first and second slots for positioning the power tool to perform an operation on a workpiece located on said supporting surface over at least one of said elongated slots; and workpiece guide means carried by said supporting surface and including a pair of fences adjustably secured to said supporting surface in spaced relation to straddle one of said elongated slots and to be movable along the length of the other one of said elongated slots.

* * * * *